United States Patent [19]

Boyd

[11] 4,313,530
[45] Feb. 2, 1982

[54] BRAKE ACTUATOR FOR BICYCLES AND THE LIKE

[76] Inventor: Winnett Boyd, 32 Restwell Crescent, Willowdale, Ontario, Canada, M2K 2A3

[21] Appl. No.: 110,494

[22] Filed: Jan. 8, 1980

Related U.S. Application Data

[63] Continuation-in-part of Ser. No. 815,921, Jul. 15, 1977, Pat. No. 4,199,046, which is a continuation-in-part of Ser. No. 763,653, Jan. 28, 1977, abandoned.

[51] Int. Cl.³ .................... B60K 41/20; B60K 13/08
[52] U.S. Cl. .................... 192/41 S; 188/82.6
[58] Field of Search ............ 192/5, 6 R, 6 B, 8 C, 192/41 S; 188/26, 24, 82.5, 82.6

[56] References Cited

U.S. PATENT DOCUMENTS

| | | | |
|---|---|---|---|
| 1,488,714 | 4/1924 | Schurmann | 192/5 |
| 1,866,755 | 7/1932 | Detilloux | 192/5 |
| 1,983,824 | 12/1934 | Starkey | 192/41 S |
| 2,336,757 | 12/1943 | Starkey | 192/41 S |
| 2,903,901 | 9/1959 | MacDonald | 192/81 C |
| 2,940,563 | 6/1960 | Milenkovic et al. | 192/5 |
| 2,949,990 | 8/1960 | Douglas et al. | 192/5 |
| 3,153,352 | 10/1964 | Sajovec et al. | 192/81 C |
| 3,680,663 | 8/1972 | Kine | 188/24 |
| 3,726,372 | 4/1973 | Baer et al. | 192/81 C |

FOREIGN PATENT DOCUMENTS

| | | | |
|---|---|---|---|
| 57230 | 8/1945 | Austria | 188/24 |
| 567033 | 2/1924 | France | 192/5 |
| 899664 | 6/1945 | France | 192/5 |
| 300578 | 9/1932 | Italy | 192/5 |
| 456997 | 4/1950 | Italy | 188/24 |
| 207297 | 11/1923 | United Kingdom | 192/5 |

Primary Examiner—George H. Krizmanich
Attorney, Agent, or Firm—Ridout & Maybee

[57] ABSTRACT

A coaster brake for a bicycle has a brake operating lever consisting of a yoke and integral arm coupled to the pedal crankshaft of the bicycle by a self-acting unidirectional friction clutch, formed by a coil spring embracing the crankshaft. In order to facilitate its insertion into the crankshaft housing, the lever has no dimension greater than the internal diameter of the housing. The spring has two portions, one on either side of the yoke, the wire forming the part of each portion nearer the yoke being of greater cross section than the part further from the yoke. The lever moves a brake actuating rod or cable actuating a wheel brake which may be of several different types.

13 Claims, 26 Drawing Figures

BRAKE ACTUATOR FOR BICYCLES AND THE LIKE

REFERENCE TO RELATED APPLICATION

This application is a continuation-in-part of my copending application Ser. No. 815,921, filed July 15, 1977, now U.S. Pat. No. 4,199,046, which was a continuation-in-part of my application Ser. No. 763,653 filed Jan. 28, 1977 and now abandoned.

FIELD OF THE INVENTION

This invention relates to brake actuating means for pedal-propelled vehicles such as bicycles. Although the invention is also applicable to pedal-propelled vehicles having more than two wheels, e.g. tricycles, it will for convenience hereinafter be explained and described in relation to bicycles, which are by far the most common form of such vehicles, without thereby implying any limitation of the scope of the invention to bicycles.

REVIEW OF THE PRIOR ART

Bicycle brakes are generally of two types, those that are hand operated and those that are foot operated. The most usual foot operated type is generally known as a "coaster" or back-pedalling brake. The braking mechanism of the conventional type of coaster brake is contained in the hub of the rear wheel of the bicycle and the operating force is transmitted by the same chain that is used for propelling the bicycle. The means of operating such a coaster brake is by back-pedalling, the reverse torque from the pedals being carried to the rear wheel via a tension force in the lower strand of the chain. The braking mechanism for a hand operated brake may be either a caliper arrangement which presses on the opposite flat sides of the rim of the wheel, a drum and shoe brake housed in the hub of the wheel, or a disc brake. Other and less satisfactory braking mechanisms have been used in the past for hand operated brakes, such as the simple "spoon" device that presses on the outside of the tire and the "stirrup" device that presses on the inside surface of the rim.

Both hand brakes and coaster brakes have disadvantages. The main disadvantage of the hand brake is the manual force required to apply it. This reduces the sensitivity of the hand for steering the bicycle, especially when one hand is removed from the handle bars.

The main disadvantage of the conventional coaster brake is that it becomes inoperative if the main drive chain accidentally breaks or slips off either the pedal or rear wheel sprocket, whilst it cannot be applied to bicycles equipped with derailleur or similar change-speed gears in which the lower strand of the driving chain cannot be used to transmit any tension force.

It has several times been proposed, in order to overcome the problem, to associate a one way clutch mechanism with the pedal crankshaft, by means of which the back-pedalling effort may be applied to a lever and thence to a brake mechanism which may be of any of the types customarily operated by a hand brake lever. One group of such proposals makes use of a ratchet and pawl mechanism to provide the one way clutch, but such mechanisms require modification of the pedal crankshaft since either the ratchet or the pawl must be securely fixed to the shaft or incorpoated in it, and will necessarily involve a significant degree of lost motion before full engagement or disengagement is achieved. Moreover, according to the relative angular positions of the ratchet and pawl or pawls, the brake will only be applicable at certain predetermined angular positions of the crankshaft. Certain mechanisms of this type can also lock themselves on, which is at best inconvenient and at worst extremely dangerous.

These problems can be overcome by using a one way clutch of the spring type, as shown in U.S. Pat. No. 1,488,714 issued Apr. 1, 1924, Italian Pat. No. 300,578 issued Sept. 13, 1932, Italian Pat. No. 456,997 issued Apr. 29, 1950 and U.S. Pat. No. 2,940,563 issued June 14, 1960. However, it is significant that although there is currently a well identified market for a coaster type brake for the popular five and ten speed bicycles equipped with derailleur type gears, none of the above inventions appears to have met with acceptance.

The majority of bicycles that are equipped with derailleur or similar change speed gears are manufactured with pedal crankshaft housings about one and a half inches in external diameter and two and a half inches long although housings of smaller diameter are quite common. A brake actuator which will be acceptable to bicycle manufacturers must be very simple and robust, have minimum drag when the brake is "off," involve no major alteration to the crankshaft housing and have a similar, if not identical, pedal crankshaft. In addition, it must be able to withstand "panic" stopping conditions without failure, such as might occur with a two hundred pound individual stamping on one of the pedals in the back-pedalling mode. Whilst an advantage of the coaster type of brake is the very large braking effort which can be developed by the user, it also raises the problem that the stresses developed in the actuator mechanism and applied to the brake mechanism, if not otherwise prevented, can also be very large if the user's entire weight is applied to one of the pedals in an attempt to obtain extra braking effort.

In the patents referred to above, proposals have been made to place the clutch mechanism either between the crank housing and one of the pedal cranks (as in Italian Pat. No. 456,997), or within the pedal crank arm (as in U.S. Pat. No. 1,488,714). In either case, the space available is very limited, and a non-standard crankshaft and/or crank arm is required. Moreover, the mechanism is subject to the accumulation of dirt and may be exposed to mechanical damage. Location within the crank housing itself (as in Italian Pat. No. 300,578) would thus be preferable were it not for the fact that in many cases the space between the crankshaft and the housing is extremely limited, thus making it difficult or impossible to house or assemble the structure shown in the Italian patent without cutting or slotting the housing to such an extent as to severely weaken it. The crankshaft housing is an integral part of the bicycle frame, and in order to obtain acceptance of a brake mechanism, it is desirable that no redesign of this component should be required, as would be the case for example in the structures of U.S. Pat. No. 2,940,563. Moreover, it should be possible to fabricate, assemble and maintan the brake mechanism without the use of esoteric or laborious techniques.

SUMMARY OF THE INVENTION

Objectives of the present invention are to provide a coaster type brake in which the brake actuating force is derived by a clutch connection from the pedal crankshaft, which can be constructed to withstand panic braking forces, which can be housed within most conventional types of pedal crankshaft housings, even those providing quite restricted clearance around the crankshaft, which is simple and inexpensive to manufacture and assemble, and which causes minimal drag during normal operation of the bicycle.

The invention improves upon a device for operating a brake of a pedal operated vehicle which device comprises a brake operating lever projecting through an opening in a pedal crankshaft housing of the vehicle, the lever being connected to a friction coupling which concentrically surrounds a pedal crankshaft within the housing, the coupling comprising two spring coils lightly embracing the crankshaft, the sense of winding of each spring coil, proceeding from a free end to a constrained end connected to the lever, being the same as that direction of rotation of the crankshaft producing forward movement of the vehicle, and the two spring coils being wound from a common length of wire which is looped at said constrained ends, the loop engaging the lever.

According to a first feature of the invention, the lever comprises an arm and a yoke encircling part of the circumference of the crankshaft, and is so dimensioned that in its plane of operation it has no dimension greater than the internal diameter of the pedal crankshaft housing but when the yoke engages the crankshaft, the arm of the lever projects through the opening in the housing beyond its outer surface.

According to a further feature of the invention, the spring coils are of a diameter such as just not to embrace the crankshaft, and at one end a further spring coil lightly embracing the crankshaft, the turns of which coil are of wire having a smaller cross section than that forming the turns of the first coils, overlaps and is attached to the diametrically outward side of the free end of each first coil so as to draw the latter in contact with the crank shaft housing when the second coil is placed under tension.

By these means, it is possible with the great majority of conventional crankshaft housings to assemble, without significant weakening of the housing, a clutch connection strong enough to withstand even panic breaking conditions, said clutch offering minimum drag on the pedal crankshaft during normal forward pedalling of the bicycle.

According to a further feature of the invention, the resultant thrust on the lever during brake operation, applied by the spring coils and a brake operator actuated by the lever is sustained through a thrust bearing: this enables a more compact assembly to be utilized, and facilitates assembly.

Further features of the invention will become apparent from the following description of preferred embodiments of the invention with reference to the accompanying drawings.

DESCRIPTION OF THE PREFERRED EMBODIMENTS

Figures 1, 2, 3, 4:
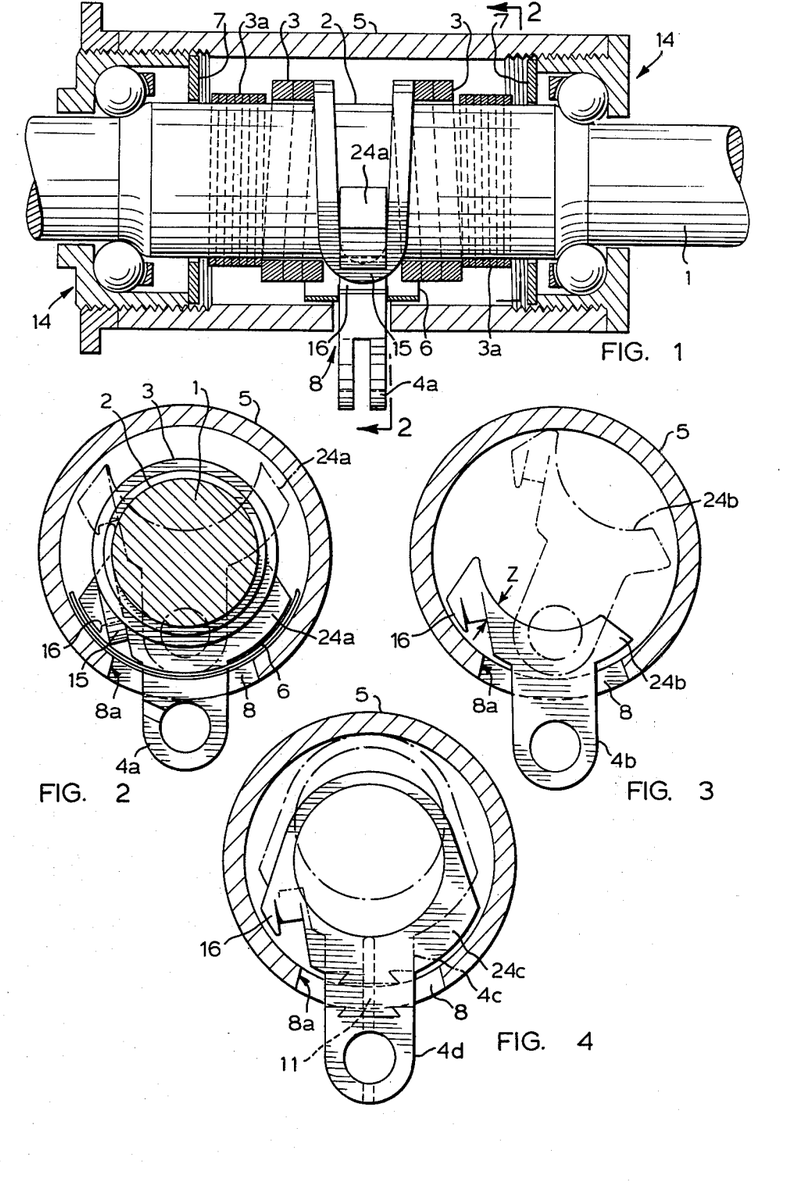
FIG. 1 is a vertical section through the crankshaft housing of a bicycle, longitudinally of the housing and transversely of the bicycle, showing a first embodiment of brake operator according to the invention.
FIG. 2 is a section on the line 2—2 in FIG. 1.
FIG. 3 is a section corresponding to FIG. 2, but with certain parts omitted for clarity and illustrating a modification of the embodiment of FIGS. 1 and 2.
FIG. 4 is a section corresponding to that of FIG. 3, illustrating a further modification.

Referring first to the embodiment of FIGS. 1 and 2, the brake operator is accommodated between the pedal crankshaft 1 and the crankshaft housing 5 of a bicycle, the crankshaft being journalled within the housing by means of conventional ball race assemblies 14. All of these components may be of entirely conventional construction except that crankshafts of a waisted profile having a central portion of reduced diameter are not suitable: the central portion of the shaft between the races should have a cylindrical outer surface 2 of uniform diameter. The only non-standard feature of the crankshaft housing is the presence of a slot 8, described further below, in the bottom of the housing.

The major components of the brake operator are a lever comprising a yoke 24a and a lever arm 4a, and a spring coil assembly comprising spring coils 3 joined to one another by a connecting loop 15 which engages a complementary groove 16 formed in one arm of the yoke 24a. The lever arm 4a projects through the slot 8, and an apertured sheet metal shield 6 placed over the arm serves the dual purpose of preventing dirt from entering the housing through the slot 8 and helping to retain the loop 15 in the groove 16.

Figure 7:
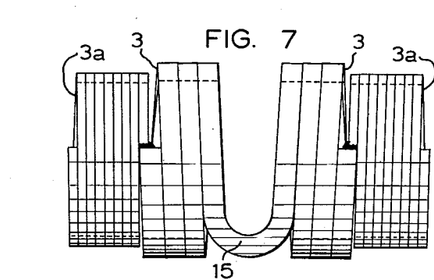
FIG. 7 is a front (relative to the direction of travel of the bicycle) elevation of the spring coil assembly seen in FIGS. 1 and 2.
Figure 8:
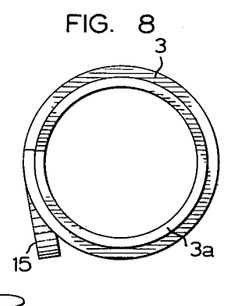
FIG. 8 is an end elevation of the spring coil assembly.

The construction of the spring coil assembly is best understood by references to FIGS. 7 and 8. The inner portions of the two coils 3 and the loop 15 are formed of a continuous length of square section steel wire. A square section is selected to provide maximum tensile strength in minimum bulk, but rectangular configurations other than square are possible if space requirements dictate a deeper but narrower coil. The outer portions 3a of the two coils are formed of wire of smaller cross section than the inner portions. In the embodiment shown, the cross sectional dimensions of the wire forming the outer portions are half those of the wire forming the inner portions. This enables a substantially larger number of turns to be accommodated in an assembly of the same width than would be possible if wire of the same section as that used for the inner turns was used throughout. The inside diameter of the turns in the outer portions is such that they lightly embrace the surface 2 of the crankshaft: the inside diameter of the turns on the inner portions is slightly larger so that they are normally just clear of the surface 2. The combination of the coil assembly is discussed further below in relation to the operation of the invention.

The lever comprising the yoke 24a and the arm 4a is dimensioned so that, as shown in chain-dotted lines in FIG. 2, it has no dimension exceeding the internal diameter of the crankshaft housing 5 and can thus be inserted into the housing until the arm 4a drops into the slot 8 without any necessity for the slot to be enlarged to accommodate oblique entry of the arm. Before the lever is so inserted, the shield 6 is placed over the arm 4a, the latter extending through loop 15 of the spring assembly. The three parts are then inserted into housing 5 and manipulated so that arm 4a drops through slot 8 and the loop 15 engages the groove 16, whereafter the crankshaft 1 is passed through the spring coils and the ball race assemblies 14 are assembled. Washers 7 may be provided to prevent any contact between the coils and the balls, or ball cages, if used, of the ball race assemblies.

In order to enable a longer lever arm to be utilized, the lever configuration may be as shown in FIG. 3, the yoke 24b being offset relative to the arm 4b. This arrangement permits a longer lever arm to be used without increasing the maximum dimension of the lever beyond the internal diameter of the crankshaft housing 5, as shown in chain-dotted lines in FIG. 3.

In FIG. 4, the yoke 24c is shown to include an integral strap so as to surround the crankshaft. In this case, the length of the lever arm 4c that can be accommodated within the crankshaft housing internal diameter is very limited, so a separate lever arm extension 4d of any required length is provided which can be attached to the projecting portion of the arm 4c after the latter is assembled into the crankshaft housing. As shown, the extension 4d is connected to the arm 4c by a dovetail joint and a locking pin 11, but other forms of connection could of course be utilized.

Figure 5:
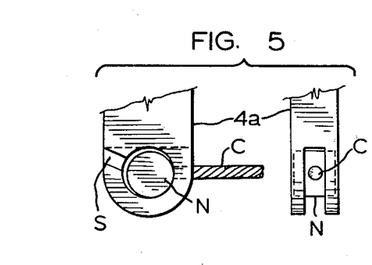
FIGS. 5 and 6 each show fragmentary views of connections between the brake operator and a brake cable and a brake rod respectively.

FIG. 5 illustrates a typical form of connection between a lever arm such as 4a and a brake operating cable C terminating in a nipple N. The lever is formed with a clevis, one arm of which is provided with a slot S so that the cable may be introduced into the fork of the clevis when the nipple is introduced into its bore.

Figure 6:
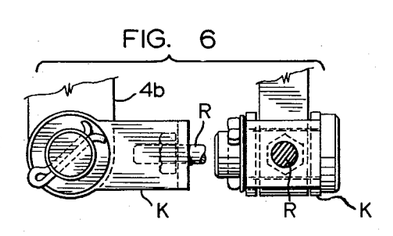

FIG. 6 illustrates a typical form of connection between a lever arm such as 4b and a brake operating rod R using a shackle K. This form of connection requires a greater projection of the lever arm from the crankshaft housing to provide the necessary clearance for the shackle.

Figure 9:
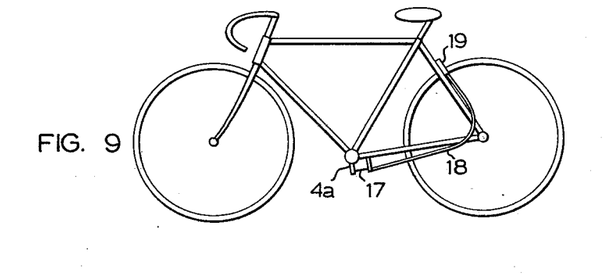
FIGS. 9–12 are diagrammatic elevations of bicycles illustrating the application of the invention to different types of rear wheel brake mechanism.

FIGS. 9–12 illustrate different ways in which the brake actuator can be applied to a bicycle. In FIG. 9, the lever arm 4a of a lever as shown in FIG. 2 is attached to a cable 17 which passes through a flexible sheath 18 to a conventional caliper brake 19. Because of the direction of approach of the brake cable, the type of brake normally used on ladies' bicycles with hand operated rear brakes is appropriate, although it should be noted that it is an advantage of the present invention that the same brake assemblies can be used for bicycles both with and without cross-bars.

Figure 10:
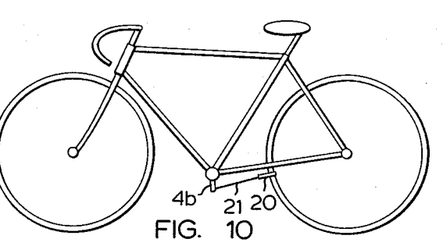
Figure 11:
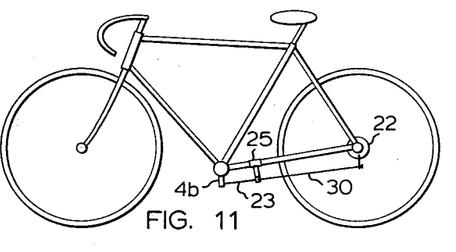

In FIG. 10, a caliper brake 20 is operated by a direct tension linkage which may be either a cable, or a rod 21 attached to the lever arm 4b of a lever as shown in FIG. 3 (or the extension 4d of a lever as shown in FIG. 4). In FIG. 11, a drum brake 22 of known type is applied to the rear wheel hub of the bicycle, and braking force is transmitted to a braking arm of the drum brake from the lever arm 4b (or 4d) by rods 23 and 30 and a step-out lever 25.

Figure 12:
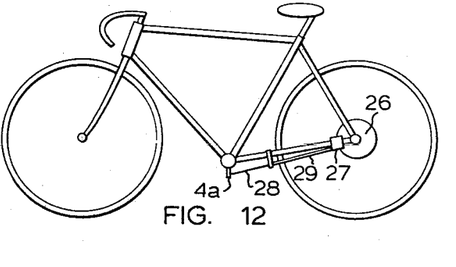

In FIG. 12, a brake disc 26 is applied to the rear wheel hub of the bicycle, and a brake caliper 27 is actuated by a cable 28 connected to the lever arm 4a and passing through a flexible sheath 29.

Considering now the operation of the embodiments so far described, normal forward pedalling of the bicycle will result in the crankshaft 1 rotating in an anti-clockwise direction as seen in FIG. 2. The light engagement between the spring coil portion 3a and the surface 2 of the crankshaft will generate a reaction in the coils, which are restrained against rotation by the lever, tending to unwind the coils and thus reduce their engagement with the crankshaft and the resultant drag on the crankshaft. Since the portions 3a are in any event of fairly light gage wire, this drag will be slight in the first place. Upon back-pedalling, the drag of the coils will be transmitted to the brake rod or cable, and the resulting reaction will tend to wind up the coils, thus tightening their embrace of the crankshaft 2 and producing a positive feedback effect. As the force applied to the brake rod or cable increases, the inner portions of the coils 3 will also embrace the crankshaft, yet further enhancing the braking effort available. The tension in the wire forming the coils when these are in frictional engagement with the crankshaft will fall exponentially according to the distance from the loop 15 and thus the maximum tensions developed in the turns of the outer portions of the coils will always be small compared with the maximum tension developed in the inner coils. This enables the outer coils to be of greatly reduced cross section with the dual benefits of reducing the width of the coil for a given number of turns and reducing the drag on the crankshaft during normal forward pedalling. At the same time, the section of the wire used for the inner portions of the coils can be made large enough to withstand the tensions generated under panic braking conditions. With components of typical dimensions, and assuming worst-case conditions, the sum of the tensile loads sustained by both spring coils at their ends adjacent the loop 15 could be of the order of 5000 lbs. Such a load can be sustained if the wire is of quite ordinary spring steel, 0.110 inches square and heat treated to provide sufficient ultimate tensile strength. Only a small fraction of this load will be transmitted to the coil portions 3a, the actual proportion depending on the coefficient of static friction between the coil assembly and the crankshaft. Even if the coefficient of static friction is as low as 0.075, which is most improbable, and there are three turns in each inner portion of the coils, less than a quarter of the maximum tension will be applied to the coil portions 3a, and if the coefficient of static friction is a more probable 0.150, less than one sixteenth of the maximum tension will be applied to the coil portions 3a.

In order to sustain the tensions applied, the wire forming the portions 3a may be butt welded to the wire forming the remainder of the coils prior to coil winding and heat treatment, but other forms of connection may be preferred, provided that they will sustain the necessary loads and be sufficiently reliable. Some advantageous methods of joining the wires are discussed below with reference to FIGS. 21-24. Although the portions 3a have been shown as having a square section, a round section could be employed provided the space available permits the cross sectional area to be maintained. Moreover, although spring steel has been mentioned as a material for the spring coils, only a very small degree of resilience in the latter is in fact required. The tensile strength of the metal employed is more important than its yield strength since a small degree of plastic yielding can be sustained without failure of the clutch.

The yoke 24a, b or c should of course be sufficiently strong to sustain the loads applied to it by the coil assembly, but conventional bicycle brake equipment may not be strong enough to withstand the forces which could be applied through the lever arm under panic braking conditions. However, such forces can be limited by locating the forward end 8a of the slot 8 at a point such that it will act as a stop for the lever arm before the strain imposed on the brake linkage and brake reaches an excessive level. Should the stop 8a ever become operative under normal conditions, this indicates an immediate need for brake adjustment. The stop also prevents excessive forces being applied to the outer end of the lever arm, a particularly valuable feature when a lever arm extension 4d is being employed.

With certain types of brake, the high forces which can readily be developed by the brake operator of the invention are an advantage, as when a disc brake as shown in FIG. 12 is to be operated. Such disc brakes often require higher operating forces than can readily be developed by conventional hand brake operating levers.

Figure 13:
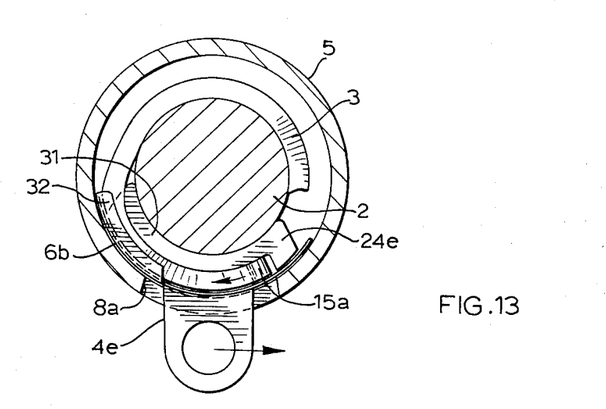
FIG. 13 is a section corresponding to that of FIG. 3, illustrating a modified embodiment of the invention suitable for application when the clearance between the crankshaft and the crankshaft housing is particularly limited.
Figure 14:
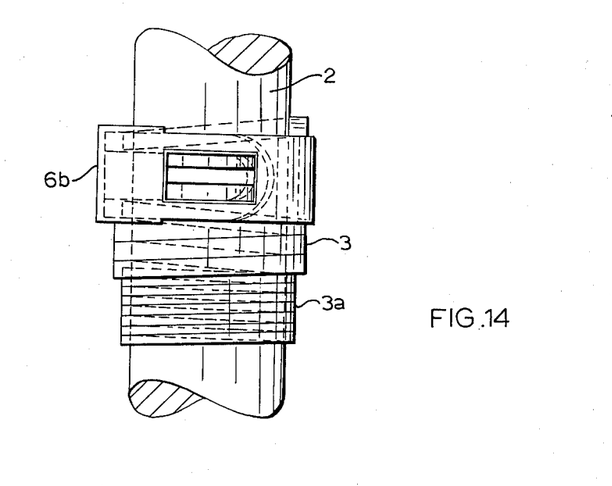
FIG. 14 is a fragmentary plan view showing parts of the brake actuator of FIG. 13 assembled on the bicycle crankshaft.

The embodiments of the invention so far described are suitable for use with bicycles having crankshaft housings about one and a half inches external diameter and two and a half inches long, with a crankshaft about 13/16 inch in maximum diameter. Although these dimensions are typical, both larger and smaller housings are used, and with housings of smaller internal diameter, it may be found that the presence of the groove 16 in the yoke of the embodiments previously described will reduce the dimension Z (see FIG. 3) to such an extent that the yoke is seriously weakened. In the embodiment of FIGS. 13 and 14, the loop 15a of the spring coil assembly is taken around the root of the lever arm 4e, The reaction to tension in the spring coil assembly during braking will now tend to cause the yoke to rock away from the crankshaft, rather than being pulled against it as in the previous embodiments, and this problem is overcome by forming side flanges 31 on the yoke 24e which support portions of the first turn of each coil 3, resulting in tension in the coils generating forces holding the yoke against the crankshaft surface 2. The shield 6b is formed with side flanges 32 which act to prevent the coils 3 from slipping sideways off the flanges 31.

With this arrangement, it is possible to fit a brake actuator of adequate strength to withstand panic braking forces within a crankshaft housing having an outside diameter of only 1⅜ inches, a wall thickness of about 3/32 inch and a crankshaft diameter of 13/16 inch.

Figures 15, 16, 17, 18, 19, 20, 21, 22, 23, 24:
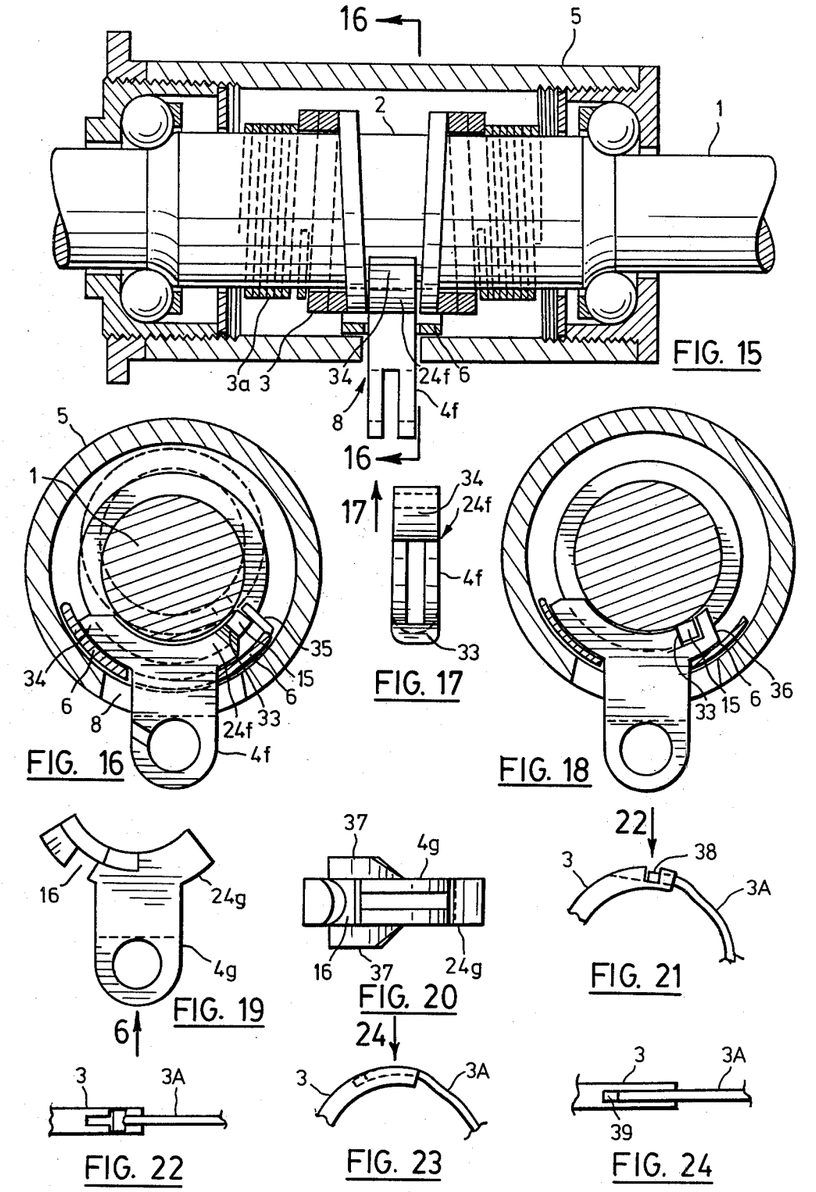
FIG. 15 is a section corresponding to that of FIG. 1, illustrating a further embodiment of the invention.
FIG. 16 is a section through the embodiment of FIG. 15 on the line 16—16.
FIG. 17 is a view from the direction of the arrow 17 in FIG. 15 of the yoke used in that embodiment.
FIG. 18 is a view corresponding to that of FIG. 16, showing a modification of the yoke.
FIGS. 19 and 20 are end and plan views of a modified version of the yoke of FIG. 3.
FIGS. 21 and 22, and 23 and 24 are end and plan details of two arrangements for joining the larger and smaller spring coils used in the various embodiments of the invention.

The embodiment of FIGS. 15-17 represents a further approach to accommodating the brake mechanism within a housing of limited diameter, as well as facilitating assembly. The arrangements previously described necessitate installation of the yoke and spring in the crankshaft housing prior to installation of the crankshaft itself. This assembly procedure cannot be adopted where the crankshaft is forged in one piece with the pedal cranks, and also requires care to obtain and maintain the desired interrelationship of the various parts until they are locked in place by insertion of the crankshaft. The embodiment of FIGS. 15-17 permits the spring to be pre-assembled on the crankshaft before insertion of the latter and minimizes the free space required within the crankshaft housing to permit assembly, whilst maximizing the length of the operating lever arm obtainable relative to the overall yoke dimensions. In describing these embodiments, the same reference numerals will be used as in FIGS. 1 and 2 except where parts are significantly modified, and only those features will be described which are necessary to the understanding of these differences.

As compared with FIGS. 1 and 2, the main difference resides in the yoke 24f and its engagement with the bight portion 15 of the spring which passes around the entire yoke so that the bight portion engages the rear end 33 of the yoke. This means that when the brake is applied tension in the spring pulls the front end 34 of the yoke against the shield 6 which acts as a thrust bearing to transfer the load imposed on the yoke by the spring and the brake operator through the lever 4f to the crankshaft housing. The shield 6 should be of material such as bronze appropriate to perform this function as well as preventing dirt from entering the crankshaft housing. In order to maintain the bight portion 15 of the spring in contact with the yoke during forward pedalling of the bicycle, a tab 35 on the shield is bent up around the bight portion. This function may alternatively be performed by an extension 36 of the yoke as shown in FIG. 18.

In assembling the embodiments of FIGS. 16-18, the shield 6 is placed over the arm of the lever 4f and the assembly placed in the crankshaft housing so that the lever projects through the opening 8 in the crankshaft housing 5. The spring coil assembly is then positioned over the surface 2 of the crankshaft 1, which is inserted into the housing sufficiently eccentrically (see the broken lines in FIG. 16) for one half of the spring assembly to pass the yoke 24f. The crankshaft is then lowered so that the bight 15 of the spring assembly passes between the tab 35 and the end 33 of the yoke, or between the end 33 of the yoke and the extension 36, whereafter the bearing assemblies 14 can be installed. With this arrangement, the minimum clearance between the crankshaft surface 2 and the interior of the housing need be little more than double the thickness of the wire forming the spring portions 3, whilst the yoke 24f may be made short, thus minimizing the overall dimensions of the lever 4f. The arrangement may also be used where the crankshaft 1 and pedal cranks are forged in one piece.

FIGS. 19 and 20 show a stronger alternative to the yoke 24b shown in FIG. 3. The yoke 24b in FIG. 3 is weakened by the presence of groove 16. In the embodiment of FIGS. 19 and 20, the weakness introduced into the yoke 24g is compensated for by providing lateral flanges 37 which underlie the bight 15 of the spring.

FIGS. 21 to 24 illustrate two alternative methods of securing the spring portions 3a to the spring portions 3. In the arrangement of FIGS. 21 and 22, the wire forming the spring portion 3a is formed with a hammer end which is received in a complementary slot in the upper surface of the end of the wire forming spring portion 3 and held in place simply by its own spring action. This is an arrangement that is suitable when a single piece crank is used as the portions 3 and 3a of the clutch coil may be separately assembled onto shaft 1 and then the hammer heads of portion 3a sprung into the complementary slots of portion 3. The hammer end may be replaced with a straight end and complementary slot 39 as shown in FIGS. 23 and 24 with the fastening being done by brazing. The engagement of these fastening arrangements with the outer side of the wire 3 assists in drawing the latter into contact with the crankshaft during engagement of the brake, whilst the lapped nature of the joints makes them very strong.

Figure 25:
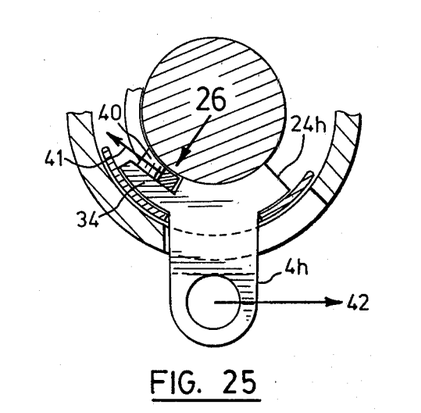
FIG. 25 is a partial section through the crank housing of a bicycle illustrating a further embodiment of the invention.
Figure 26:
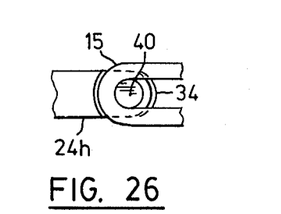
FIG. 26 is a fragmentary view from the direction of the arrow 26 in FIG. 25.

The bight 15 of the spring assembly may be received in a groove on the radially inner surface of the yoke without the reaction from the spring and the brake actuator being sustained by the crankshaft housing 5. Such an arrangement is shown in FIGS. 25 and 26 and has the advantage of permitting simplified fabrication of the yoke 24h. A part ciruclar groove is formed near the front end 34 of the yoke in its radially inner surface by simple application of a trepanning cutter so as to leave a round pillar 40 which is engaged by the loop 15. The configuration causes the resultant of the reaction from the braking forces 41, 42 to be sustained by the crankshaft whilst greatly simplifying machining of the yoke. The groove is located so that the spring acts on the yoke at a point on the opposite side of the lever 4h from the direction of the braking force 42.

What I claim is:

1. In a device for operating a brake of a pedal operated vehicle which device comprises a brake operating lever projecting through an opening in a pedal crankshaft housing of the vehicle, the lever being connected to a bight connecting two spring coils which concentrically surround and frictionally engage a pedal crankshaft within the housing.
   the improvement wherein the lever comprises a yoke engaging said bight and surrounding part of the circumference of the crankshaft, and is so dimensioned that in its plane of operation it has no dimension greater than the internal diameter of the pedal crankshaft housing but when the yoke partially surrounds the crankshaft an arm of the lever projects through the opening in the housing beyond its outer surface.

2. A device according to claim 1, wherein the point of engagement of the spring bight with the yoke is so disposed that the resultant of the forces applied to the yoke by said spring and said lever during operation of the brake is applied to the crankshaft.

3. A device according to claim 2, wherein said bight engages a groove in said yoke on its surface remote from the crankshaft.

4. A device according to claim 3, wherein said yoke has flanges extending laterally beneath portions of said bight.

5. A device according to claim 1, wherein the point of engagement of the spring bight with the yoke is so disposed that the resultant of the forces applied to the yoke by said spring and said lever during operation of the brake is applied to the pedal crankshaft housing.

6. A device according to claim 5, wherein said resultant is applied to said pedal crankshaft housing through a thrust bearing.

7. A device according to claim 6, wherein the thrust bearing is formed by part of a shield surrounding the lever within the crankshaft housing and closing the opening in said housing.

8. A device according to claim 7, wherein the bight surrounds the yoke and the shield has an inwardly projecting portion engaging said spring bight and holding it in engagement with the yoke.

9. A device according to claim 1, wherein the spring coils have inner portions and outer portions remote from said bight which are of reduced cross section, said reduced cross section outer portions being connected to the outer side of the inner portions.

10. A device according to claim 9, wherein the inner ends of the spring coil outer portions are brazed into complementary slots in the outer surfaces of the coil inner portions.

11. A device according to claim 9, wherein the inner ends of the spring coil outer portions are of hammer configuration and inserted in complementary slots in the outer ends of the inner portions of the spring coil.

12. A device according to claim 2, wherein said bight engages a groove in said yoke on its surface nearest the crankshaft and located so that the spring engages the yoke at a point on the opposite side of the lever from the direction of the braking force applied by the lever.

13. A device according to claim 12, wherein the groove is formed in the end of the yoke by a trepanning cutter.

* * * * *